United States Patent Office 2,724,981
Patented Nov. 29, 1955

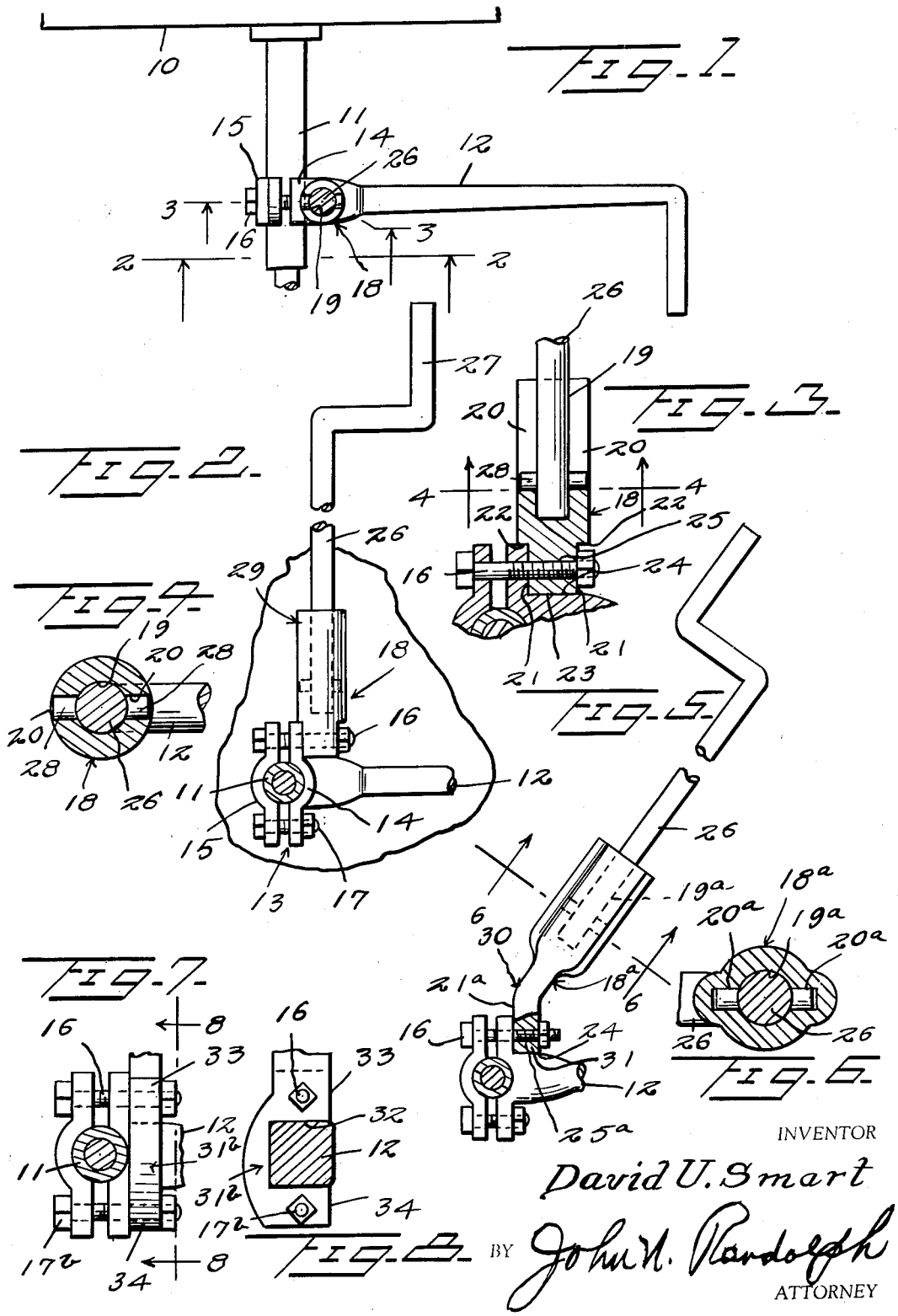

2,724,981

TRACTOR FOOT BRAKE ATTACHMENT

David U. Smart, Bostic, N. C.

Application February 20, 1953, Serial No. 337,946

7 Claims. (Cl. 74—481)

This invention relates to a novel attachment or adapter for a conventional foot brake pedal of a tractor and which provides a convenient means for demountably supporting an engine starting crank when not being used for its intended purpose and which when supported by the socket or adapter functions therewith to provide an auxiliary hand brake to be employed either with or in place of the foot pedal for applying the brake controlled by the foot pedal.

Tractors are conventionally provided with no means for conveniently supporting the engine starting crank. Accordingly, the present invention provides such a support or holder for demountably supporting the starter crank and whereby the crank will function with the support or holder as an auxiliary hand brake lever to a foot brake or for use in lieu of the foot brake.

A further object of the invention is to provide a crank support or holder of extremely simple construction which may be mounted by a fastening or fastenings of a brake pedal for conveniently supporting the starting crank in a position readily available for removal from the holder for use as a crank or for use while applied to the holder as a hand brake.

Various other objects and advantages of the invention will hereinafter become more fully apparent from the following description of the drawing, illustrating presently preferred embodiments thereof, and wherein:

Figure 1 is a horizontal sectional view, partly in top plan, illustrating one form of the invention;

Figure 2 is a side elevational view thereof partly in section, taken substantially along a plane as indicated by the line 2—2 of Figure 1;

Figure 3 is an enlarged fragmentary vertical sectional view, partly in side elevation, taken substantially along a plane as indicated by the line 3—3 of Figure 1;

Figure 4 is a cross sectional view taken substantially along a plane as indicated by the line 4—4 of Figure 3;

Figure 5 is a view similar to Figure 2 of a slightly different form of the invention;

Figure 6 is a cross sectional view thereof taken substantially along a plane as indicated by the line 6—6 of Figure 5;

Figure 7 is a fragmentary side elevational view, similar to Figure 5 and illustrating a modification therein, and Figure 8 is a fragmentary front elevational view, partly in section, taken substantially along a plane as indicated by the line 8—8 of Figure 7.

Referring more specifically to the drawing, and first with reference to Figures 1 to 4, a portion of a conventional tractor wheel brake 10 is illustrated in Figure 1 having a brake shaft 11 extending transversely therefrom. A foot pedal 12 has a clamp 13 at its inner end disposed transversely of the longitudinal axis of the pedal 12 and which includes a clamp section 14 permanently secured to or formed integral with the inner end of the brake pedal shank or arm and a detachable clamp section 15. The ends of the clamp section 15 are detachably and adjustably secured to the clamp section 14 by nut and bolt fastenings 16 and 17 for securely clamping the brake pedal 12 to the brake shaft 11 to cause the shaft 11 to turn with the pedal 12 for applying the brake of the wheel, not shown, on which the brake portion 10 is mounted. The parts previously described, except the nut and bolt fastening 16, are conventional.

The invention, designated generally 18, comprises a socket member forming a holder and support for an engine starting crank. The member 18 has a longitudinally extending recess 19 opening outwardly of its upper end. The upper portion of the member 18 is provided with diametrically opposed slots 20 which open outwardly of the upper end thereof and which preferably terminate above the lower end of the recess 19. The lower end of the member 18 is reduced on opposite sides thereof to provide oppositely disposed substantially parallel flat faces 21 and downwardly facing shoulders 22. The lower end 23 of the holder and support 18 rests upon an upper portion 24 of the inner end of the pedal 12. One of the flat faces 21 bears against the outer side of the upper end of the clamp section 14 and the shoulder 22 disposed thereabove rests on the upper end of said clamp section, as illustrated in Figure 3. With the parts thus disposed, a bore 25 which extends through the restricted lower end of the member 18 and opens perpendicularly through the flat faces 21 thereof, aligns with the opening of the upper end of the clamp section 14, so that the bolt of the fastening 16 may extend through the bore 25. The nut of the fastening 16 is applied to the end of the bolt and tightened against the other face 21 for securing the holder member 18 rigidly on the brake pedal 12. The fastening 16 differs from the fastening 17 only in that it is elongated to accommodate the holder 18. If desired, the recess 19 may constitute a bore and could extend from end-to-end through the member 18.

The holder 18 is adapted to demountably support a conventional engine starting crank 26 which is provided adjacent its shank end and remote to its handle 27 with the usual cross pin 28. Said shank end of the crank 26 is inserted downwardly into the upwardly opening recess or socket 19 and the ends of the pin 28 slidably engage the slots 20 which open forwardly and rearwardly for supporting the crank 26 with its shank portion coaxially of the member 18 and with the offset handle 27 thereof either offset forwardly, as illustrated in Figure 2 over the pedal 12, or rearwardly behind said pedal. The crank handle 27 is preferably offset forwardly when supported by the holder 18 and combines therewith to form a hand brake 29. In lieu of pressing downwardly on the brake pedal 12, the crank handle 27 can be grasped and pushed forwardly and downwardly for accomplishing the same result of turning the brake shaft 11 clockwise, as seen in Figure 2, for applying the brake controlled by said shaft, or the hand brake lever 29 may be employed to augment the foot pedal 12. Obviously, the holder 18 will provide a stable support for the crank 26 when not being used with said holder as a hand brake lever and the crank will be conveniently supported thereby in a position from which it can be readily removed from said holder for use in a conventional manner for starting a tractor engine, not shown. Thus, except when the crank 26 is being employed as such it is supported by the holder 18 to function in conjunction therewith when needed as a hand brake lever.

Figures 5 and 6 illustrate a slightly modified form of the holder, designated generally 18a, having a recess or socket 19a for the same purpose as the recess or socket 19. In lieu of the slots, the holder 18a is provided with longitudinally extending grooves 20a which are disposed in opposed relationship and open into the socket 19a and out of the upper end of the member 18a. The lower end of the holder 18a differs from the lower end of the holder 18 and comprises an elongated restricted shank 30 having a free end portion which is disposed at an oblique angle to the axis of the upper socket portion 19a of the holder 18a. Said end portion 31 has flat opposite sides 21a through which a bore 25a thereof opens to receive the upper fastening 16 to secure the holder 18 to the pedal 12 with one of the faces 21a abutting the outer side of the upper end of the clamp section 14 and with the terminal of the end 31 resting on the upper pedal surface 24. The socket portion 19a extends upwardly and forwardly from the shank 30 to receive the shank end of the crank 26 which engages the recess 19a. The ends of the pin 28 slidably fit the grooves 20a for supporting the crank 26 non-turnably on the holder 18a. With the holder 18a, the offset crank handle 27 is preferably offset rearwardly, as illustrated in Figure 5, to most conveniently locate it for use. The holder 18a otherwise functions in conjunction with the crank 26 in the same manner and for the same purpose as previously described in reference to the holder 18.

Figures 7 and 8 illustrate a modification of the shank portion 31 of the holder 18a, which shank portion, designated generally 31b, is elongated and provided with a laterally opening notch 32 to accommodate therein the portion of the brake pedal shank located adjacent the clamp section 14. Portions 33 and 34 of the shank end 31b, which are disposed above and below the notch 32, respectively, abut against the outer side of the upper and lower ends of the clamp section 14 and are apertured to receive the shanks of fastenings 16 and 17b. The fastening 17b differs from the fastening 17 in that it is elongated to correspond to the fastening 16.

Various other modifications and changes are contemplated and may obviously be resorted to, without departing from the spirit or scope of the invention as hereinafter defined by the appended claims.

I claim as my invention:

1. A hand brake attachment for a foot operated brake pedal comprising an elongated holder member having an apertured lower end adapted to receive and be secured by a clamp fastening immovably to a brake pedal, said holder having an upper portion recessed to define an upwardly opening socket adapted to detachably and non-turnably support therein the shank end of an engine starting crank to provide a holder for the starting crank when not in use as a crank, and said starting crank functioning with the holder to provide a hand brake lever.

2. A hand brake attachment as in claim 1, said socket recess including opposed portions slidably receiving the cross pin of the starting crank for non-turnably supporting the starting crank in the holder.

3. A holder for detachably supporting a starting crank comprising an elongated member having a lower end adapted to receive a clamp fastening and to be detachably secured thereby immovably to a brake pedal clamp, said holder having a recessed upper portion adapted to receive the shank end of an engine starting crank for demountably supporting the starting crank thereon when not in use as a crank, said holder and the starting crank combining to form an auxiliary hand brake lever.

4. A holder as in claim 3, said socket portion having slots communicating with the recess thereof and opening outwardly of the upper end of the holder member and adapted to slidably and non-turnably receive a cross pin of the crank.

5. A holder as in claim 3, said socket portion including opposed inwardly opening grooves adapted to receive a cross pin of the crank for nonrotatably mounting the crank in the holder.

6. A holder as in claim 3, said lower end portion of the holder member having a transverse notch adapted to accommodate therein a portion of the brake pedal and having portions disposed above and below said notch through each of which a clamp fastening is adapted to extend for securing the holder to end portions of a clamp of the brake pedal.

7. The combination with a brake pedal having a clamp at one end thereof formed of sections connected by fastenings for securing the brake pedal to a brake applying shaft, an elongated holder member having an apertured lower end receiving one of said clamp fastenings for securing the holder member immovably to the brake pedal, said holder member extending upwardly from the clamp at an angle to the axis of the brake pedal and having a recessed upper portion defining an upwardly opening socket, an engine starting crank having a shaft end fitting in said socket whereby the crank is supported by the holder member in a readily accessible position when not in use as a crank, and said holder member cooperating with the crank, when applied thereto, to form an auxiliary hand brake lever for turning the shaft to which the pedal clamp is secured.

References Cited in the file of this patent

UNITED STATES PATENTS

| | | |
|---|---|---|
| 1,119,689 | Draper | Dec. 1, 1914 |
| 1,221,435 | Frykberg | Apr. 3, 1917 |
| 1,558,697 | Marts | Oct. 27, 1925 |
| 2,181,788 | Maas | Nov. 28, 1939 |

FOREIGN PATENTS

| | | |
|---|---|---|
| 659,334 | Great Britain | Oct. 24, 1951 |